United States Patent
Botwright

(10) Patent No.: US 10,844,840 B2
(45) Date of Patent: Nov. 24, 2020

(54) ASSEMBLY, SYSTEM AND METHOD FOR OFFSHORE INSTALLATION OF WIND TURBINES

(71) Applicant: MHI Vestas Offshore Wind A/S, Aarhus N (DK)

(72) Inventor: Adrian Botwright, Sabro (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 16/464,876

(22) PCT Filed: Dec. 18, 2017

(86) PCT No.: PCT/DK2017/050439
§ 371 (c)(1),
(2) Date: May 29, 2019

(87) PCT Pub. No.: WO2018/113883
PCT Pub. Date: Jun. 28, 2018

(65) Prior Publication Data
US 2019/0383270 A1    Dec. 19, 2019

(30) Foreign Application Priority Data
Dec. 23, 2016    (DK) .................. 2016 71041

(51) Int. Cl.
*F03D 13/25* (2016.01)
*E02B 17/00* (2006.01)
(Continued)

(52) U.S. Cl.
CPC ............. *F03D 13/10* (2016.05); *F03D 13/22* (2016.05); *B63B 2035/446* (2013.01);
(Continued)

(58) Field of Classification Search
CPC .. E02B 2017/0091; F03D 13/10; F03D 13/20; F03D 13/22; F03D 13/25; Y02E 10/727
See application file for complete search history.

(56) References Cited

U.S. PATENT DOCUMENTS 6,568,712 B1    5/2003 Aaron, III
8,482,149 B2    7/2013 Uphues et al.
(Continued)

FOREIGN PATENT DOCUMENTS

CN    102145790 A    8/2011
CN    102906420 A    1/2013
(Continued)

OTHER PUBLICATIONS

European Patent Office, International Search Report and Written Opinion in PCT Application No. PCT/DK2017/050439, dated Mar. 19, 2018.
(Continued)

*Primary Examiner* — Frederick L Lagman
(74) *Attorney, Agent, or Firm* — Wood Herron & Evans LLP

(57) ABSTRACT

An assembly of two structural parts of a wind turbine wherein the structural parts are to be connected in a flange-to-flange connection, the assembly further comprising a wind turbine installation system for guiding two structural parts of a wind turbine during installation, the system comprising: a guide system for guiding the engagement of the first structural part to the second structural part, the guide system comprising: a guide post coupled to the first structural part; a guide receiver coupled to the second structural part and configured to receive the guide post therein; and a shock absorber arranged to dampen shock loads from the engagement of the guide post with the guide receiver.

21 Claims, 7 Drawing Sheets

(51) Int. Cl.
*F03D 13/20* (2016.01)
*F03D 13/10* (2016.01)
*B63B 35/44* (2006.01)

(52) U.S. Cl.
CPC ...... *E02B 2017/0091* (2013.01); *F03D 13/25* (2016.05); *F05B 2230/604* (2013.01); *F05B 2240/95* (2013.01); *Y02E 10/727* (2013.01)

(56) References Cited

U.S. PATENT DOCUMENTS

| | | |
|---|---|---|
| 2010/0307097 A1 | 12/2010 | Word, III et al. |
| 2011/0039432 A1 | 2/2011 | Muller et al. |
| 2011/0176904 A1 | 7/2011 | Stiesdal |
| 2012/0272614 A1* | 11/2012 | Perner ............... F03D 13/22 52/745.17 |
| 2014/0237932 A1* | 8/2014 | Moestrup ............ E04H 12/085 52/651.01 |
| 2014/0248090 A1 | 9/2014 | Fernandez Gomez et al. |
| 2015/0082720 A1* | 3/2015 | Rodriguez Tsouroukdissian ........ E02B 17/027 52/298 |
| 2015/0204312 A1* | 7/2015 | Patterson ............ E04H 12/085 285/412 |

FOREIGN PATENT DOCUMENTS

| | | | |
|---|---|---|---|
| CN | 104040075 A | 9/2014 | |
| DE | 202010000868 U1 | 12/2010 | |
| EP | 2402591 A2 | 1/2012 | |
| EP | 2662497 A1 * | 11/2013 | ............ F03D 13/22 |
| EP | 2770199 A2 | 8/2014 | |
| EP | 2998570 A1 | 3/2016 | |
| WO | 2009127608 A2 | 10/2009 | |
| WO | 2011117005 A2 | 9/2011 | |
| WO | 2011154110 A1 | 12/2011 | |

OTHER PUBLICATIONS

Danish Patent and Trademark Office, Search and Examination Report in PA 2016 71041, dated Jun. 7, 2017.
China National Intellectual Property Administration, First Notification of Office Action issued in corresponding CN Application No. 201780080047.5 dated Apr. 8, 2020, original Chinese language and English translation, 19 pages.

* cited by examiner

ASSEMBLY, SYSTEM AND METHOD FOR OFFSHORE INSTALLATION OF WIND TURBINES

TECHNICAL FIELD

Aspects of the present invention relate to soft landing and guide systems for wind turbine installation, and more particularly to systems for transferring wind turbine components from a vessel to its intended installation foundation and an assembly of two structural part of a wind turbine.

BACKGROUND

The installation of wind turbines on an offshore foundation is usually carried out from the vessel via which the turbine components, particularly tower sections, were transported to the offshore platform.

In order to allow for a stable installation, a vessel may be equipped with legs that may be lowered to the seabed prior to installation. These legs lift the vessel's hull out of the water and thereby transform the floating vessel to a generally fixed vessel. As the transfer of components is now effectively being carried out between a fixed foundation and a fixed crane platform on the vessel, the impact of the waves on the installation process is greatly reduced. Installation is therefore less dependent on the sea conditions, and is therefore not limited to specific times of the year when the weather and sea conditions are optimal for alignment of turbine components.

However, designing a vessel with lowerable legs is expensive, and as wind turbines are being installed in water of increasing depth, it will become virtually impossible to design vessels with sufficiently long legs to lift the vessel hull out of the water. Furthermore, the implementation of lowerable legs to jack up an installation vessel is dependent on good seabed soil conditions, as well as a lack of seabed obstructions (for example, sea cables, boulders, or even footprints from previous installations). Therefore, it would be desirable to install wind turbine components from a floating vessel.

However, due to the influence of the rolling wave motion on the floating vessel, there is a high likelihood of shock-induced impact and damages occurring when trying to land the turbine components on the platform. The rolling, heaving and pitching of the floating vessel may cause a turbine component that has been 'landed' initially to be lifted off from the foundation. Subsequent (potentially damaging) impacts between components are then more likely to occur. In addition, it is also very difficult to align the turbine components with one another to the necessary degree of accuracy when the crane being used to move one of the components is attached to a moving floating vessel.

It is against this background that the embodiments of the invention have been devised.

SUMMARY OF THE INVENTION

According to an embodiment of the present invention there is provided an assembly of two structural parts of a wind turbine wherein the structural parts are to be connected in a flange-to-flange connection, the assembly further comprising a wind turbine installation system for guiding two structural parts or components of a wind turbine during installation. The system comprises a guide system for guiding the engagement of the first structural part to the second structural part. The guide system comprises a guide post coupled to the first structural part; a guide receiver coupled to the second structural part and configured to receive the guide post therein; and a shock absorber arranged to dampen shock loads from the engagement of the guide post with the guide receiver. The system is used in an assembly of two structural parts of a wind turbine wherein the structural parts Advantageously, this installation system ensures that the wind turbine structural parts of the assembly are aligned during installation, so as to allow bolts to be easily installed in the flanges, thereby securing the wind turbine structural parts together. The installation system also prevents substantive damage from being caused to the tower sections due to impact and accidental rebound or jarring (for example, due to inexact alignment resulting from movement of the waves). The installation system may be used in combination with a heave compensation device attached to the crane which is carrying out the installation.

Optionally the wind turbine installation system of the assembly may be utilised to guide the installation of a variety of wind turbine structural parts. For example, the two structural parts of the assembly may comprise a foundation and a tower section; a foundation and a complete tower; two tower sections; a tower and a nacelle; or a hub and a blade.

Optionally, the shock absorber includes a spring unit. In some instances, the spring unit includes a coil spring. Optionally, the shock absorber includes a damper. The damping may be adjusted for different turbine components which have different weights and accelerations associated with them.

Optionally, the shock absorber includes a descender mechanism. This advantageously controls the relative lowering speeds of the turbine structural parts, cushioning them against impacts which may otherwise arise from components being lifted off (after their initial landing) due to wave motions acting on the vessel and crane. This reduces the likelihood of damage being done to the turbine structural parts during installation.

Optionally, the descender mechanism comprises a chamber containing a flowable material, said chamber including a valve to evacuate the chamber. Preferably, the flowable material is collected upon evacuation of the chamber since this allows for recycling and prevention of possible safety hazard of the flowable material falling inside the turbine. Optionally, the flowable material is substantially incompressible, such as sand or a water based fluid. The flowable material may be granular, or may be a fluid. In some instances, the valve is a removable plug, which preferably is remotely or programmably releasable.

Advantageously, the rate of evacuation of the flowable material from the chamber is controllable, and thereby allows the rate of relative movement between the guide post and guide receiver to be controlled, thereby allowing the flanges on the turbine structural parts to be brought together and aligned without damage. In one embodiment, with a number of guide posts and guide receivers and hence chambers with flowable material, the rate of evacuation of the flowable material is individually controllable for each chamber to allow for a precise (vertical) movement of the parts to be brought together.

Optionally, the descender mechanism includes a controllable fluid circuit to control the amount of material evacuated from the chamber. The fluid circuit may be configured to control the evacuation of two or more chambers. In the case of multiple guide systems being provided on each turbine structural part, this configuration enables all of the descender mechanisms to be controlled simultaneously, to ensure that the rate of evacuation of material from every guide system is the same. This results in an even lowering or convergence of turbine structural parts.

In some cases, the guide system may include locking means configured to lock the guide post to the guide receiver when the guide post is installed within the guide receiver. The locking means ensures that the guide post and guide receiver are secured to one another, thereby allowing the crane to be detached and the final lowering and alignment of the turbine structural parts to be decoupled from the motion of the waves.

Optionally, the locking means may include one or more deployable locking members that are engageable with a respective one or more sockets. In some instances, the one or more deployable locking members are provided as part of the guide post, and the one or more sockets are provided as part of the guide receiver. Optionally, the locking members correspond to a plurality of deployable locking balls.

Optionally, the guide post is coupled to an upper structural part and the guide receiver is coupled to a lower structural part. In some cases, the shock absorber is provided as part of the guide receiver.

In some instances, the wind turbine installation system of the assembly may further comprise a plurality of alignment pins provided on one of the structural parts; and a plurality of complementary alignment slots provided on the other one of the structural parts. Each alignment slot is arranged to receive a respective one of the plurality of alignment pins to enable fine alignment of the structural parts. This configuration provides a secondary fine alignment system that aligns the flanges provided on each structural part to facilitate bolt insertion and secure attachment of the structural parts.

According to another embodiment of the present invention, there is provided a method for guiding two structural parts of a wind turbine during installation, wherein the structural parts are to be connected in a flange-to-flange connection. The method comprises converging a first structural part towards and onto a second structural part; aligning a guide post, coupled to the first structural part, with a guide receiver, coupled to the second structural part and configured to receive the guide post therein; engaging the guide post within the guide receiver; and damping, by a shock absorber, shock loads from the engagement of the guide post with the guide receiver.

The method may further comprise initiating a further movement phase of the guide post within the guide receiver; and controlling, by the shock absorber, the further relative movement of the guide post within the guide receiver.

The method may further comprise securing the guide post within the guide receiver to prevent removal of the guide post from the guide receiver.

According to another embodiment of the present invention, there is provided a guide system for a wind turbine. The guide system comprises a guide post coupled to a first structural part of the wind turbine; a guide receiver coupled to a second structural part of the wind turbine and configured to receive the guide post therein; and a shock absorber arranged to dampen shock loads from the engagement of the guide post with the guide receiver.

In summary, the installation system of the assembly of the present invention provides guidance and engagement of wind turbine components, and enables initial alignment of flanges on each component so that they may be secured together via flange bolts. In particular, the guide post-guide receiver combination performs an initial coarse alignment process, bringing flanges of the wind turbine components together within the tolerance of alignment pins and corresponding alignment slots, which carry out a secondary fine alignment process. Bolt holes in each flange are thereby aligned with one another and the flanges can be secured together. The soft landing or descender mechanism reduces and aims to prevent landing damages by damping the impact between the converging turbine structural components, and controlling the landing speed of the components whilst the fine alignment process is carried out.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A specific embodiment of the present invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
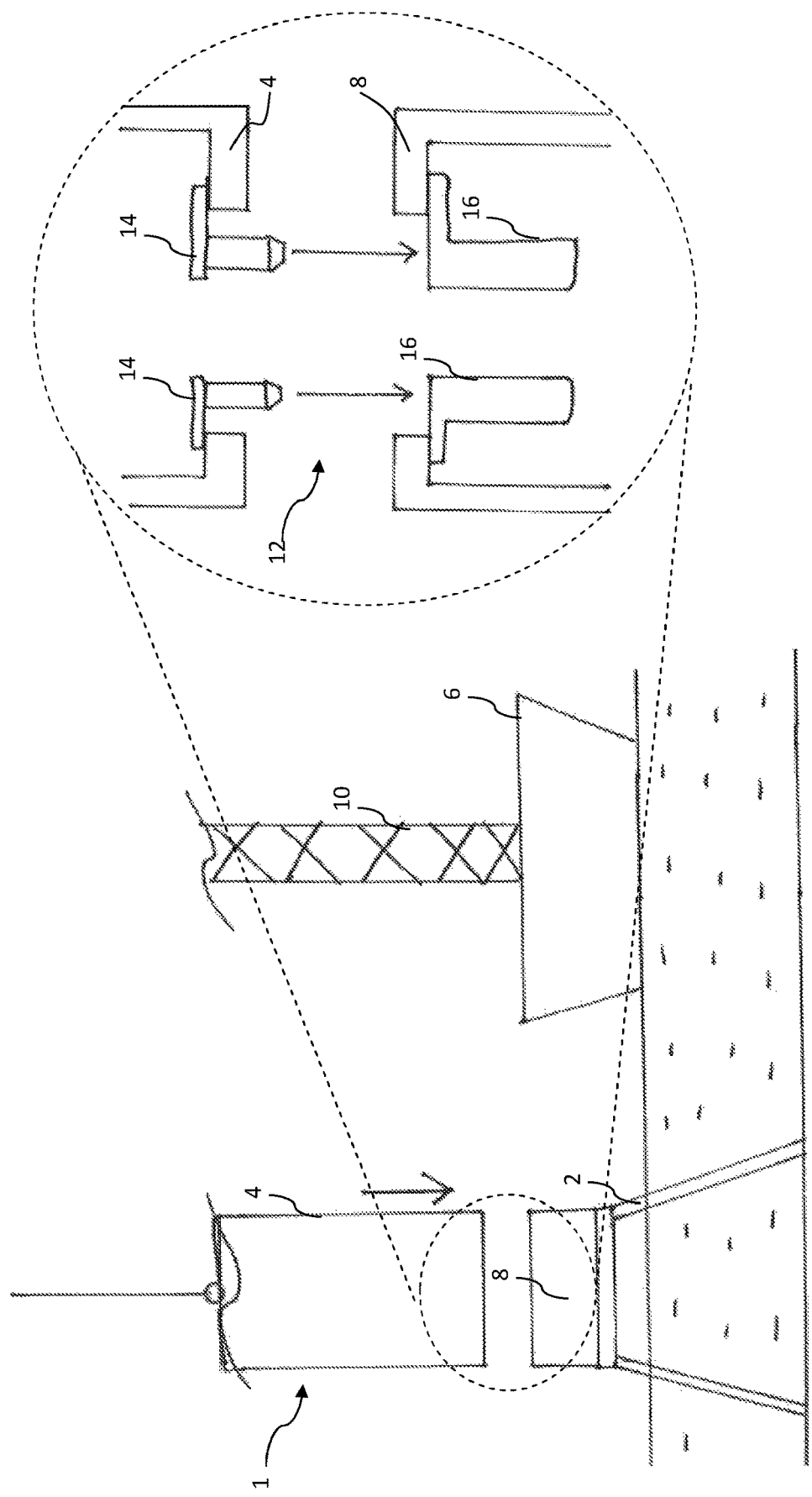
FIG. 1 shows a schematic diagram of a wind turbine in the process of being installed on a fixed offshore platform, with an inset that illustrates an installation system of an assembly according to an embodiment of the present invention.

In order to place the embodiments of the invention in a suitable context, reference will firstly be made to FIG. 1, which illustrates a wind turbine tower 1 in the process of being installed on an offshore platform or foundation 2 that is anchored to the seabed. The wind turbine tower 1 comprises an upper tower section 4 which was transported to the offshore foundation 2 on a floating vessel 6, and a lower tower section 8 also known as a transition piece, which was attached to or constructed as part of the fixed foundation 2 prior to this installation process. The upper tower section 4 is attached to a crane 10 which lowers the upper tower section 4 (in the direction of the arrow) towards the lower tower section 8, after which the two portions are then attached to one another via bolts (or any other suitable securing means).

An installation guide system 12 of the assembly is utilised to ensure accurate alignment of the upper and lower tower sections 4, 8 relative to one another, so as to prevent accidental damage to either of the turbine components resulting from misalignment. The inset to FIG. 1 provides a high-level illustration of the guide system 12, which comprises complementary male and female components attached to the upper and lower tower sections 8, 4 respectively. Specifically, in the illustrated embodiment, the upper tower section 4 comprises a plurality of male insertion members or 'guide posts' 14 whilst the lower tower section 8 comprises a corresponding plurality of female receiving units or 'guide receivers' 16. Each guide post 14 is configured to be received within, and to engage with, a corresponding one of the guide receivers 16.

The engagement between the guide receivers 16 and their respective guide posts 14 helps to guide the moving of the upper tower section 4 into alignment with the fixed lower tower section 8. It is preferred that the guide receivers 16 and guide posts 14 are larger than the locking pins/bolts and slots (not shown) that will subsequently be used to secure the two tower sections together, and are therefore easier to align even whilst the vessel 6 is moving under the influence of the waves. The use of guide posts 14, which are larger than the locking pins/bolts, also allows for a stronger construction preventing or reducing the risk of damaging the guide posts or guide receivers during use.

It should be noted that the foundation 2 itself may be fixed or floating, and may take the form of any basic foundation type such as jacket, monopile, or gravity base foundations, or some variation thereof. Furthermore, although the illustrated embodiments all involve wind turbine tower sections, it will be appreciated by the skilled person that the installation guide system and method that are utilised in the illustrated embodiments may also be easily implemented when installing assemblies of other turbine components or structural parts, such as the nacelle, hub and blades, or when installing a turbine tower section directly onto a foundation.

The configuration of the guide receivers 16 and guide posts 14 will now be described in greater detail with reference to FIGS. 2 and 3 respectively.

Figure 2:
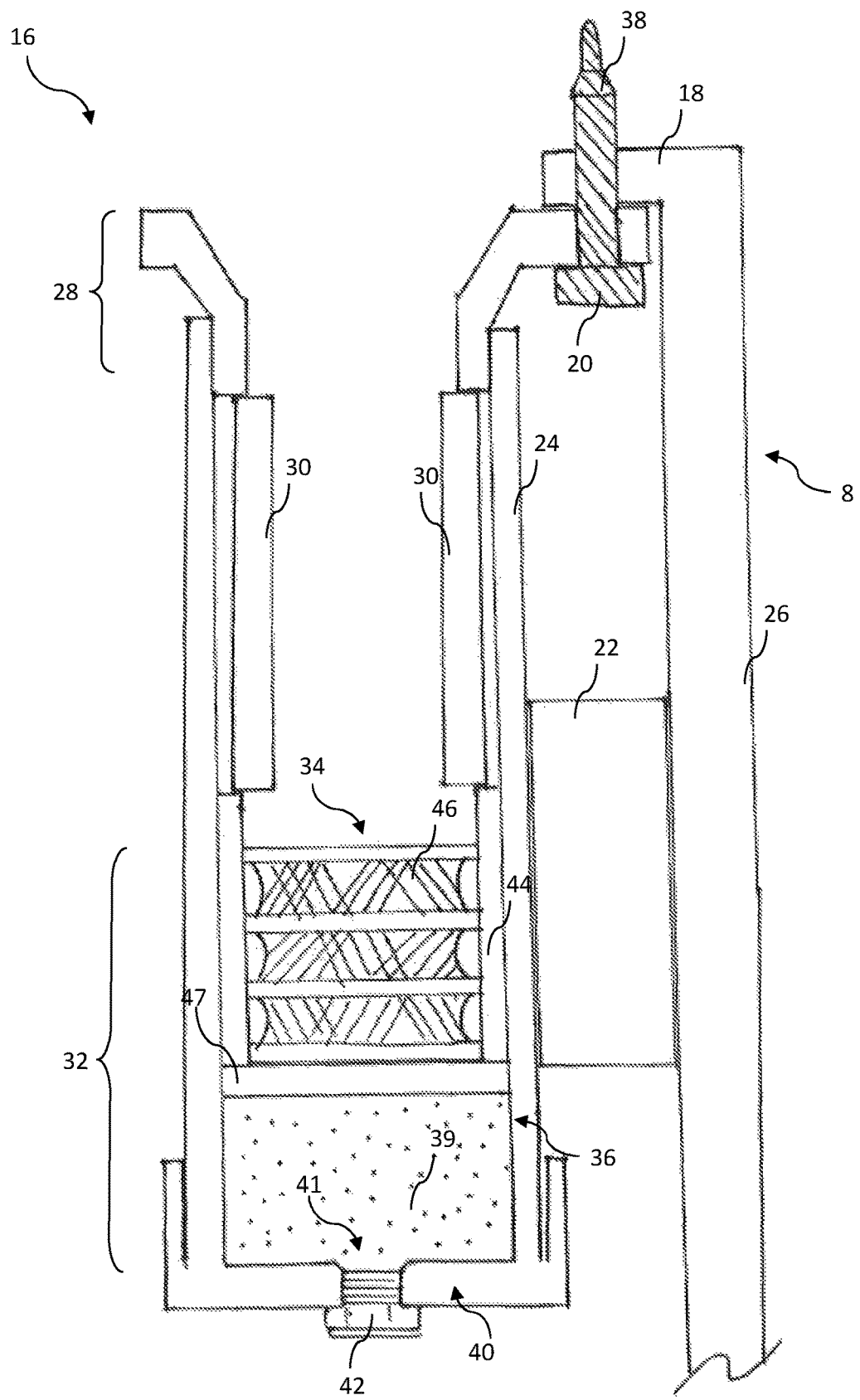
FIG. 2 shows a schematic diagram of the vertical cross-section of a guide receiver for use in the installation system of FIG. 1.

FIG. 2 shows a vertical cross-section of a guide receiver 16 according to an embodiment of the present invention. The guide receiver 16 is attached to an inwardly-projecting radial flange 18 provided around the top of the lower tower section 8. This attachment is carried out via bolt 20 and/or other similar securing means such as (electro) magnetic enhanced securing means or vacuum enhanced securing means. A brace 22 is provided which is arranged to be sandwiched between the outer walls 24 of the guide receiver 16 and an adjacent outer wall 26 of the lower tower section 8. The brace 22 prevents significant movement of the guide receiver 16 towards the lower tower section 8, and thereby prevents shearing and breakage of the connection between guide receiver 16 and tower section 8.

Figure 3:
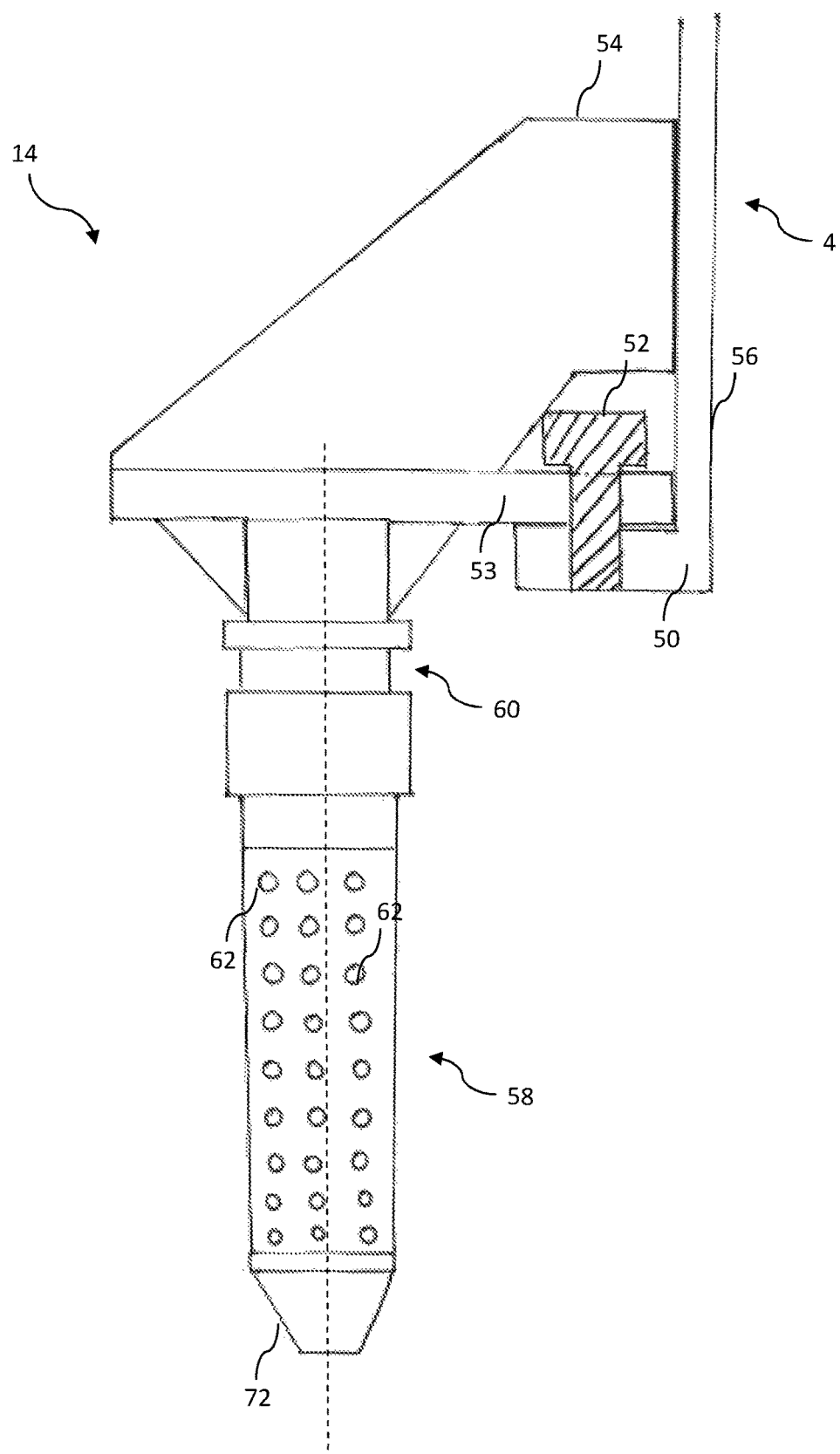
FIG. 3 is a schematic diagram of a guide post for use with the guide receiver of FIG. 2.

The guide receiver 16 is a generally cylindrical-shaped tube, or a slightly conically-shaped tube with a smaller diameter near the end corresponding to the bottom of the guide receiver, that is sized and configured for receiving the guide post 14, see FIG. 3, and comprises a funnel-shaped mouth portion 28 configured to guide the guide post 14 into the interior of the guide receiver 16. The guide receiver 16 also defines a generally cylindrical first engagement portion or sleeve 30 of the overall guide system 12 that is offset radially inwards from the outer wall 24 of the guide receiver 16, and is configured to engage with a complementary engagement portion of the guide post 14, once a sufficient portion of the guide post 14 has been inserted into the guide receiver 16. This enables the guide post 14 to be securely locked to the guide receiver 16. The first engagement portion 30 is not secured to the walls 24 of the guide receiver 16 and thereby permits a small degree of lateral or radial movement of the guide post 14 within the guide receiver 16. This allows slight misalignments of the guide post 14 with the guide receiver 16 interior, and accounts for tolerance inaccuracies between the guide post 14 and guide receiver 16. This radial movement allowance also enables additional slight lateral movement during secondary fine alignment of the turbine components.

The guide receiver 16 also comprises a shock absorber or other damping mechanism 32 that is arranged to control the movement of the guide post 14 within the guide receiver 16, so as to ensure that alignment of the upper and lower tower sections 4, 8 is carried out smoothly and with minimal damage resulting from any impact shocks between the two components. Expressed another way, the shock absorber 32 provides a soft landing for the guide post 14 into the guide receiver 16, and ensures a controlled final approach of the turbine component flanges. The shock absorber 32 comprises two main components, namely a spring unit 34 and a descender mechanism or other lowering means 36. The spring unit 34 is arranged to absorb the shock resulting from contact between the guide post 14 and the guide receiver 16; whilst the descender mechanism 36 is arranged to move the guide post 14 slowly and smoothly within the guide receiver 16 from its initial insertion and contact with the guide receiver 16 to a final resting position. In one embodiment (not shown), the shock absorber 32 has only one of the spring unit 34 and the descender mechanism or other lowering means 36, but it is highly preferred and advantageous to use a shock absorber with both a spring unit and a descender mechanism.

Since the guide receiver 16 is attached to the lower tower section 8 in this embodiment, and the guide post 14 is inserted downwards into the guide receiver 16, the descender mechanism 36 is provided at the base of the guide receiver 16. Although other configurations are envisaged, in the illustrated embodiment, the spring unit 34 is located above and rests on top of the descender mechanism 36, and the first engagement portion 30 is located above and rests on top of the spring unit 34.

One or more alignment pins 38 are also provided on or near the flange 18 of the lower tower section. The alignment pins 38 are configured for insertion into corresponding alignment slots (not shown) on the upper tower section 4, and enable fine alignment of the two tower sections 4, 8 to be achieved before they are fastened together via securing means (also not shown), as will be described with reference to FIG. 4. The alignment pins 38 may be a part of the securing means 20 (as shown in FIG. 2), or a separate unit independent of the securing means, guide posts, or guide receivers.

In use, when the guide post 14 is initially inserted into the guide receiver 16, a nose 72 or leading portion of the guide post 14 comes into contact with the spring unit 34. The impact of the initial contact between the two components is damped by the spring unit 34, thereby preventing damage from being caused to either component as a result of this initial contact. Furthermore, as the initial 'landing' of the guide post 14 is cushioned and softened by the spring unit 34, damage to the flanges 18, 50 due to an initial landing impact is prevented, and the guide post 14 is prevented from rebounding backwards within (or even out of) the guide receiver 16. It is desirable to avoid such a rebound as it could result in further (additional) jarring contact between the guide receiver 16 and guide post 14 (and therefore potentially also between the two tower sections), which could cause damage to the guide system 12, as well as to the tower sections 4, 8. In some cases, the forces exerted on the guide system components could result in shearing of the bolts attaching one or both of the guide receiver 16 and guide post 14 to their respective tower sections 4, 8. Secondary impacts from lift-off, caused by heaving, rolling and/or pitching of the vessel due to wave motions, and hence damage to the flange 18, 50 faces are also substantially prevented.

Following this initial contact, a portion of the guide post 14 engages with the first engagement portion 30 of the guide receiver 16 and secures the guide system components together. Once secure engagement between guide receiver 16 and guide post 14 is achieved, the descender mechanism 36 is activated and supports the weight of the guide post 14 and the associated tower section 4 as they are lowered further, allowing the crane 10 to be detached from the upper tower section 4, or at least for the connection between the crane 10 and tower section 4 to slacken. Any subsequent movement of the crane 10 due to the influence of the waves acting on the floating vessel 6 is therefore substantially decoupled from the converging movement of the tower sections 4, 8, thereby decreasing the likelihood of damage to the tower sections 4, 8 during the rest of the installation process.

The shock absorber 32 and its component parts will now be described in greater detail. The descender mechanism 36 comprises a flowable material 39 (for example, sand) provided in the base 40 of the guide receiver, for example in a compartment or chamber which separates the material 39 from the rest of the guide receiver components. An opening 41 is provided in the base 40 of the guide receiver 16, and removal or evacuation of the flowable material 39 from the guide receiver 16 is controlled by a valve or plug 42 inserted into the opening 41. Activation of the descender mechanism 36 involves removal of the plug 42 or use of the valve to cause the flowable material 39 to be evacuated from the guide receiver 16. By controlling the evacuation rate of the material 39, the opening 41 and valve/plug 42 thereby control the lowering speed of the guide post 14 within the guide receiver 16. The flowable material 39 may be granular (for example, sand, as in the illustrated embodiment), or it may be a fluid. Preferable, the flowable material 39 is substantially incompressible. The valve or plug 42 may also be provided with a monitoring or metering functionality, which would allow the flow of material 39 to be controlled to ensure that the speed of descent (of guide post 14 within guide receiver 16) is within acceptable (pre-defined) limits, so as to prevent damage to the turbine and guide system components. The valve or plug is preferably remotely controllable for each set of guide post and guide receiver and optionally flowable material is preferably collected in the process of evacuating the compartment. In one embodiment, the descender mechanism (or a second descender unit) allows for a substantially longer descending than required for the flanges of the two structural parts to engage. This allows for release of tension in the spring unit and hence enhances safe separation and re-use of the guide system after use since the tension corresponding to (part of) the weight of the tower may otherwise be released when the guide post and the guide receiver are separated.

The spring unit 34 of the illustrated embodiment comprises a tube 44 containing a plurality of elastomeric springs or pads 46, such as those that are found in Leg Mating Units (LMUs) which have been used previously in the mating process of floatover operations. The tube 44 rests on top of the chamber containing the descender mechanism 36, and specifically, on top of a plate 47 which separates the flowable material 39 from the rest of the guide receiver 16 interior; the tube 44 is configured to also be slidably movable within the guide receiver 16. When the guide post 14 initially contacts the spring unit 34, the elastomeric springs 46 take up the load exerted by the guide post 14 and its associated tower section 4, and are compressed. Subsequently, when the descender mechanism 36 is activated and the level of the flowable material 39 within the guide receiver 16 decreases, the tube 44 moves smoothly downwards within the guide receiver 16 (and therefore so does the first engagement portion 30) until all of the material 39 has been removed and/or the guide post 14 reaches its desired final resting position.

It is noted that although this component is referred to as a 'spring unit', it need not necessarily comprise springs, or may comprise components in addition to springs, so long as the functionality of absorbing the shock loads arising from initial contact between guide post 14 and guide receiver 16 is achieved. For example, the spring unit 34 may comprise a coil spring or any other kind of resilient spring. Additionally, or alternatively, the spring unit 34 may comprise a damper that is configured to damp the motion of the guide post 14. For example, the spring unit 34 may comprise a chamber containing coil springs, said chamber also containing a damper post surrounded by oil or another fluid. Still other embodiments may involve the use of a compressible polymer or other material, or even an airbag, in place of the springs. Alternatively, the spring unit 34 may comprise a hydraulic type of shock absorber (such as that used in elevators), rather than an elastomeric shock absorber. For example, the shock absorber may take the form of a hydraulic cylinder and gas unit, or an external accumulator.

The illustrated embodiment utilises sand as the flowable material 39, as it is an environmentally-friendly choice that is safe to release into the surrounding environment, as it is inert and will simply collect at the base of the foundation 2. However, it will be appreciated by the skilled person that if other materials were to be used instead, the plug 42 would need to be replaced by a control valve of some kind so as to allow the fluid to be pumped or otherwise evacuated from the guide receiver 16 at a desired rate. In such a setup, the valves on all guide receivers may also be connected via a hydraulic circuit, so as to ensure that every descender mechanism 36 is activated simultaneously and the fluid is removed from each guide receiver at substantially the same rate, so as to ensure even lowering of all the guide posts. It will be appreciated that, regardless of the type of material 39 used in the descender mechanism 36, suitable means should still be provided to initiate and control the evacuation of material from the guide receiver 16, thereby controlling the descent of the guide post 14. Depending on its composition, the fluid may be released into the surrounding environment or pumped out into a storage reservoir for subsequent reuse. Additionally, or alternatively, it would be possible to install the descender mechanism on the guide post 14 instead of the guide receiver 16, as it is relative movement between the two components that is the important aspect to be achieved.

FIG. 3 shows a guide post 14 configured to be used in combination with the guide receiver 16 of FIG. 2. The guide post 14 is attached to the upper tower section 4 via a similar arrangement to that utilised for the guide receiver 16—an inwardly-projecting flange 50 is provided on the base of the upper tower section 4 and the guide post 14 is secured to this flange 50 by bolts 52 or other securing means. Specifically, a bracket 53 is secured to the flange 50 and supported in a cantilevered manner by the flange 50, with the guide post 14 suspended from the bracket 53. It is noted that the guide post 14 may also be permanently attached to the tower section (for example, via welding) but its current removability is advantageous as the guide system components may be re-used subsequently in other assemblies and installations. Similarly to the guide receiver 16, a brace component 54 is also provided, which is configured to maintain the guide post 14 in its desired position and orientation, and to prevent lateral movement of the guide post 14 towards the wall 56 of the upper tower section 4. As shown here, the brace component 54 is in the form of a wall or web. This would otherwise potentially lead to shearing of the connection between the guide post 14 and the upper tower section 4 due to contact arising from a misalignment of the guide post 14 with the guide receiver 16. In one embodiment, the guide post or the guide receiver may be connected to the flange via a resilient connection. For example, the bracket 53 and/or brace component 54 may comprise or be formed from resilient material to allow for small miss alignment or vibration during installation and/or to facilitate better alignment without damaging the guide post or guide receiver.

The guide post 14 defines a complementary second engagement portion 58 of the overall guide system 12 which portion is arranged to contact and securely engage with the first engagement portion 30 (defined by the guide receiver 16) when the guide post 14 is inserted into the guide receiver 16. The guide post 14 also comprises a locking mechanism or means 60, actuation of which results in the activation of a plurality of connectors or deployable locking members 62 provided on the second engagement portion 58, and configured to securely engage with the first engagement portion 30. For example, these locking members 62 may be received into correspondingly located and shaped sockets (not shown) provided in the first engagement portion 30. In the illustrated embodiment, these locking members 62 are designed based on ball and taper technology. This technology is fairly well known in the field of mooring connectors (for example, this technology is used by Balltec Engineering solutions and in the Ballgrab® systems of First Subsea), however a brief description of its specific application in relation to the present invention will be provided here for completeness.

Specifically, the locking members 62 comprise a plurality of metal balls that are held securely within tapered passaged or tapers (not shown), which are machined into the body of the guide post 14 and oriented at an angle to a longitudinal axis of the guide post 14. As the guide post 14 is inserted into the close-fitting guide receiver 16, the locking members 62 retract and roll backwards up their respective tapers into the body of the guide post 14. However, once the guide post 14 contacts the shock absorber 32 of the guide receiver 16, and the load of the upper tower section 4 is thereby transferred partially to the guide receiver 16, the locking mechanism 60 is activated. This causes the locking members 62 to roll back down their respective tapers, partially protrude from openings in the surface of the second engagement portion 58, and be received into sockets formed in the first engagement portion 30. This ensures secure contact between the guide post 14 and guide receiver 16 by effectively 'gripping' the surface of the first engagement portion 30. An advantage of this technology is that it is a simple connection mechanism to activate, and the grip provided by the locking members 62 is proportional to the load applied.

It will be appreciated that although the guide receiver 16 is coupled to the lower tower section 8 and the guide post 14 is coupled to the upper tower section 4 in the illustrated embodiments, the locations of the two components may be reversed. However, in this case, it may be necessary to alter the construction of the components to account for this, or to adapt the guide post 14 (now the lowermost component in the guide system 12) to comprise the shock absorber 32. Furthermore, other forms of deployable locking members may be utilised instead of ball and taper technology (for example, barbs or posts that are deployed horizontally to engage with sockets in the sides of the guide receiver 16). Alternatively, other types of clamping or locking systems may be utilised, for example an internal lifting tool (such as that used by IHC IQIP during offshore installation). Additionally, or alternatively, a secondary clamping system could be used, for example a flange clamp (not shown) which would act directly on the flanges 18, 50 via bolt holes.

Figure 4:
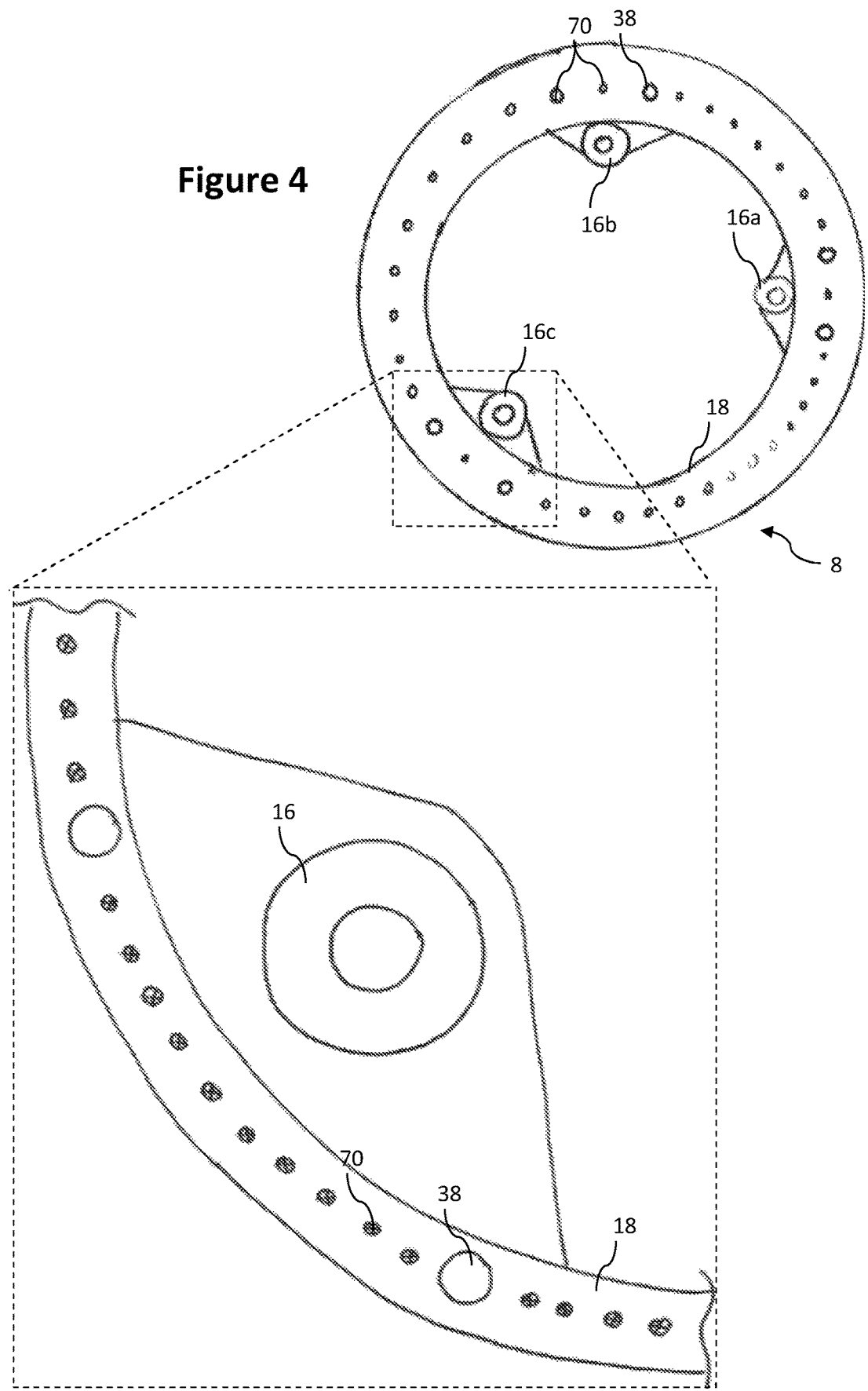
FIG. 4 shows a plan view of the base of the wind turbine tower that comprises several of the guide receivers of FIG. 3.

FIG. 4 shows a plan view of the top of the lower tower section 8, which shows the inwardly-projecting flange feature 18, as well as three guide receivers 16*a-c* located at intervals on the inner surface of the lower tower section 8. A plurality of securing means 38, 70 (for example, bolts or pins or slots for receiving bolts or pins therein) are provided around the circumference of the flange 18. A plan view of the base of the upper tower section 4 is not provided here but, as the skilled person will appreciate, such a view would effectively be a mirror image of the view of FIG. 4. Specifically, guide posts would be located around the inner circumference of the upper tower section 4 in corresponding positions to interface with respective guide receivers 16*a-c*, and securing means would be provided around the circumference of the upper turbine flange 50 corresponding to the locations of the securing means 38, 70. The number of guide receivers and guide posts may vary dependent on the size of the structural parts. Typically, the number is between three to eight and more preferably four to six as this allows for a more even distribution of the force and reduce the risk of damaging the guide posts and guide pins during engagement of the first structural part to the second structural part.

The inset of FIG. 4 shows that there are two main types of securing means utilised in this embodiment. The majority of the securing means involve the use of standard bolts being inserted into complementarily-shaped securing or alignment slots 70 provided on the two tower sections. These are used to securely attach the two tower sections to one another once they are in a final alignment. However, each guide receiver 16 also has a pair of alignment pins 38 associated with it. As previously described, these alignment pins 38 are used to perform fine adjustment of the tower sections relative to one another, so as to enable exact alignment of the securing slots 70 on the two tower sections. It should be noted that in reality, the alignment pins 38 are of a comparable size to the securing slots 70, and these components are merely shown to be differently sized in the figures to emphasize the location of the alignment pin 38 relative to the guide system 12 locations. The alignment pins 38 (which may take the form of bolts or tapered bolts) are removed once flanges 18, 50 are correctly aligned with one another, and the alignment pins 38 are replaced by standard bolts and nuts to maintain secure flange connections thereafter.

A description of the installation process according to an embodiment of the present invention will now be provided with reference to FIGS. 5*a* to 5*d*, which each highlight different stages of the process. It should be noted that these figures only illustrate the installation process with respect to a single guide post-guide receiver pair, however multiple pairs of these components are utilised when installing a single turbine tower 1, and the same process will be carried out simultaneously for each pair of components.

Figure 5A:
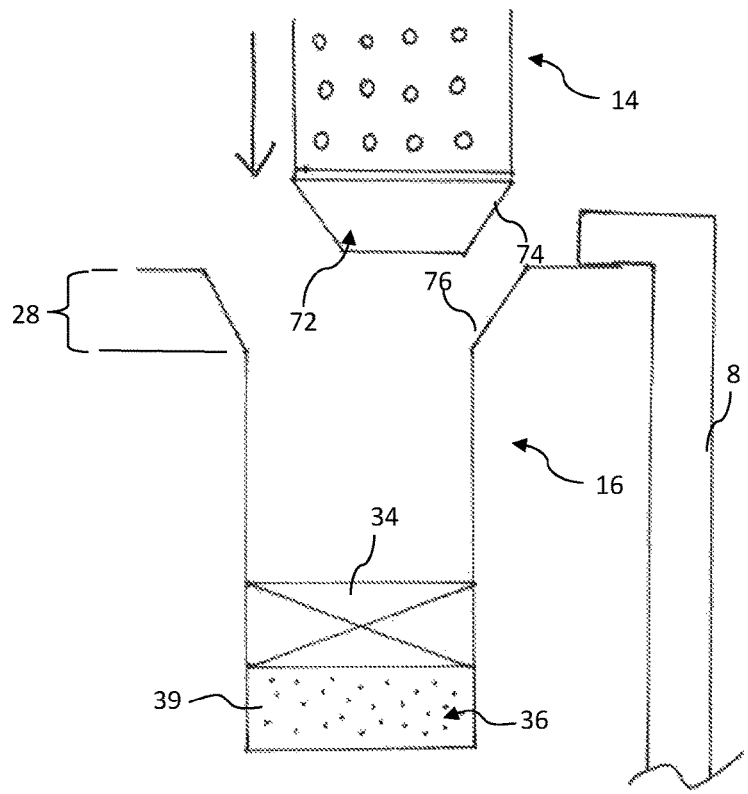
FIGS. 5a to 5d are schematic diagrams illustrating a process of installing a wind turbine tower on an offshore platform utilising the guide system components of FIGS. 2 and 3.

FIG. 5a shows the initial stage of the installation method in which the upper tower section 4 (which is attached to a crane 10) is in the process of being transferred, from the floating vessel 6 to the offshore foundation 2, for attachment to the lower tower section 8. The figure illustrates the initial fairly coarse alignment of the guide post 14 (affixed to the upper tower section 4) with the guide receiver 16 (affixed to the lower tower section 8), as the tower sections are brought together. It should be noted that a leading portion or nose 72 of the guide post 14 is generally tapered, and in this embodiment, frustoconical in shape, and is configured to be complementary to the funnel-like shape of the guide receiver mouth 28. This ensures that even if there is some slight misalignment between the two components (for example, a longitudinal axis of the guide post 14 is offset laterally by a small amount relative to that of the guide receiver 16), the angled surfaces 74, 76 of the two components will slide along one another, and the guide post 14 will be guided into the guide receiver 16.

Figure 5B:
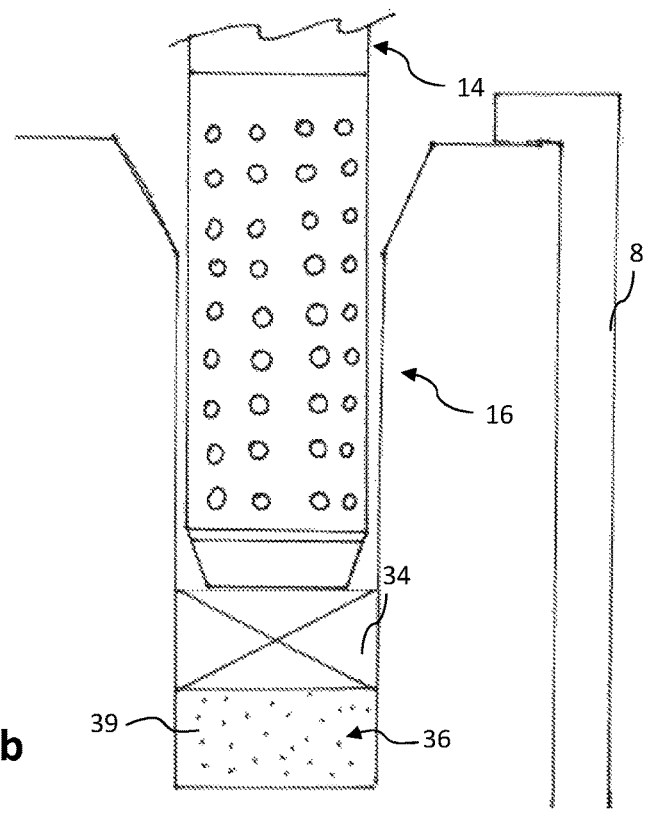

FIG. 5b shows a snapshot of the guide system during the second stage of installation. At this point, the guide post 14 has been inserted into the guide receiver 16 to a sufficient depth so as to contact the spring unit 34, which in this embodiment corresponds to a plurality of elastomeric springs (not shown in detail). These springs will compress to absorb and soften the shock of the initial 'landing' of the guide post 14, thereby preventing damage and further impact arising due to jarring or rebound of the components. At this point in time, the majority of the load of the upper tower section 4 is still being supported by the crane 10.

Figure 5C:
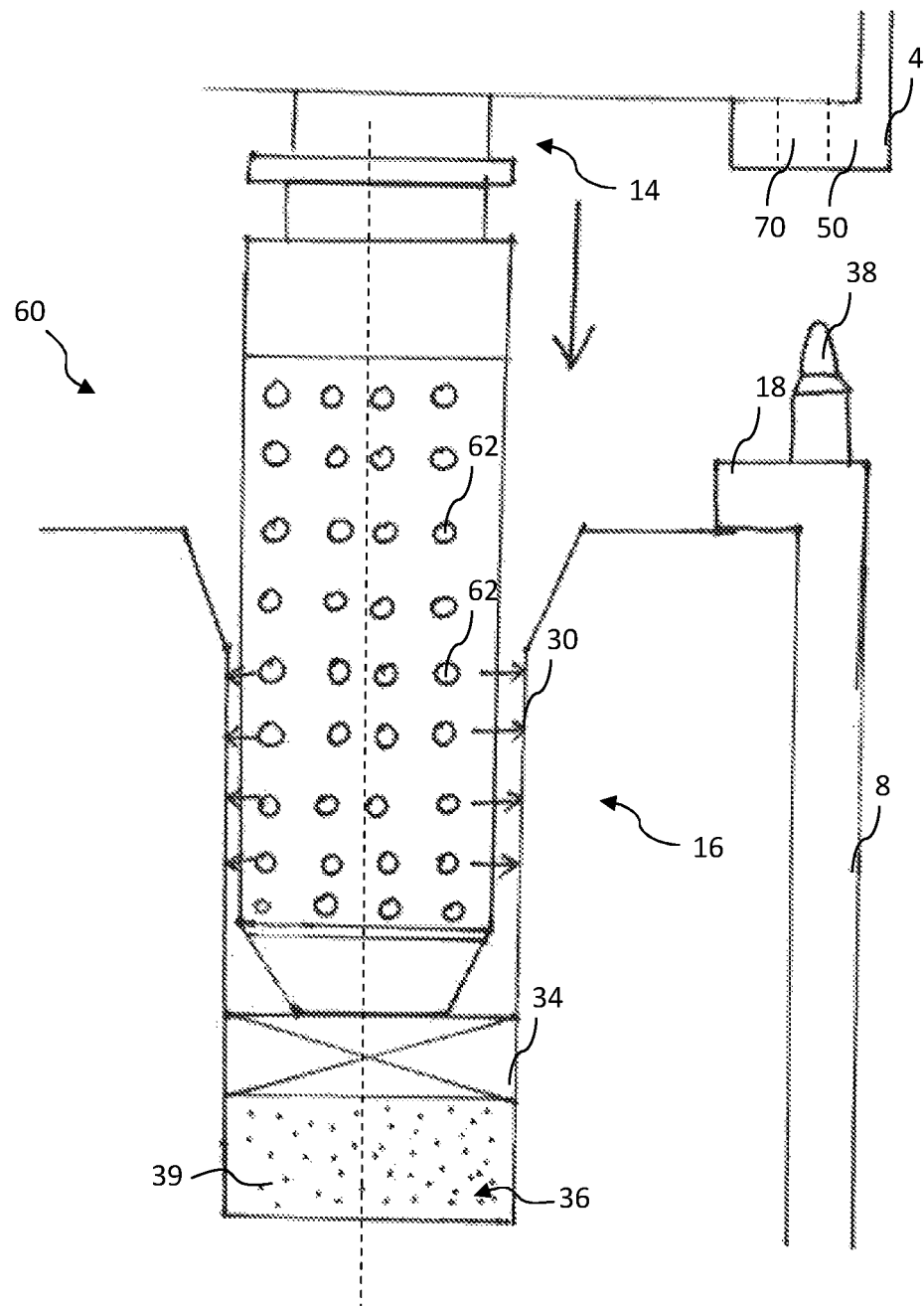

The third stage is shown in FIG. 5c, in which the crane 10 continues to lower the upper tower section 4 towards the lower tower section 8, now that the initial alignment has been successfully completed. During this third stage, an increasing proportion of the load of the upper tower section 4 is transferred from the crane 10 to the guide post 14. This increased load on the guide post 14 activates the locking mechanism 60, and results in actuation and deployment of the plurality of locking members 62. As described previously, this actuation will cause the locking members 62 to roll down their tapers (not shown) and make contact with the first engagement portion 30 of the guide receiver 16. Increasing the load on the guide post 14 increases the force, and hence the security of the grip, exerted by each locking member 62 on the guide receiver 16. At this point, as the majority of the load has been transferred from the crane 10 to the guide system components (which are securely engaged with one another), the movement of the upper tower section 4 will be largely decoupled from that of the floating vessel 6 on which the crane 10 rests, and therefore from the influence of the waves. The majority (if not all) of the movement of the guide post 14 within the guide receiver 16 is now confined to a single axial degree of freedom—namely, along a longitudinal axis of the guide receiver 16. The crane 10 may also be disconnected from the upper tower section 4 at this point if so desired. FIG. 5c also illustrates the presence of an alignment pin 38 on the lower tower section (not shown in the previous figures for simplicity) that is configured for insertion into its corresponding slot 70 in the flange 50 of the upper tower section 4, as will now be described.

It is important to note that the guide post 14 and guide receiver 16 do not lock with one another during the initial landing and shock absorption stages, and are only secured to one another once the locking mechanism 60 is activated by the transfer of weight from the crane 10 to the guide post 14. The crane 10 can then be detached from the upper tower section 4 and the final lowering and alignment of the two components can be decoupled from wave motion.

Figure 5D:
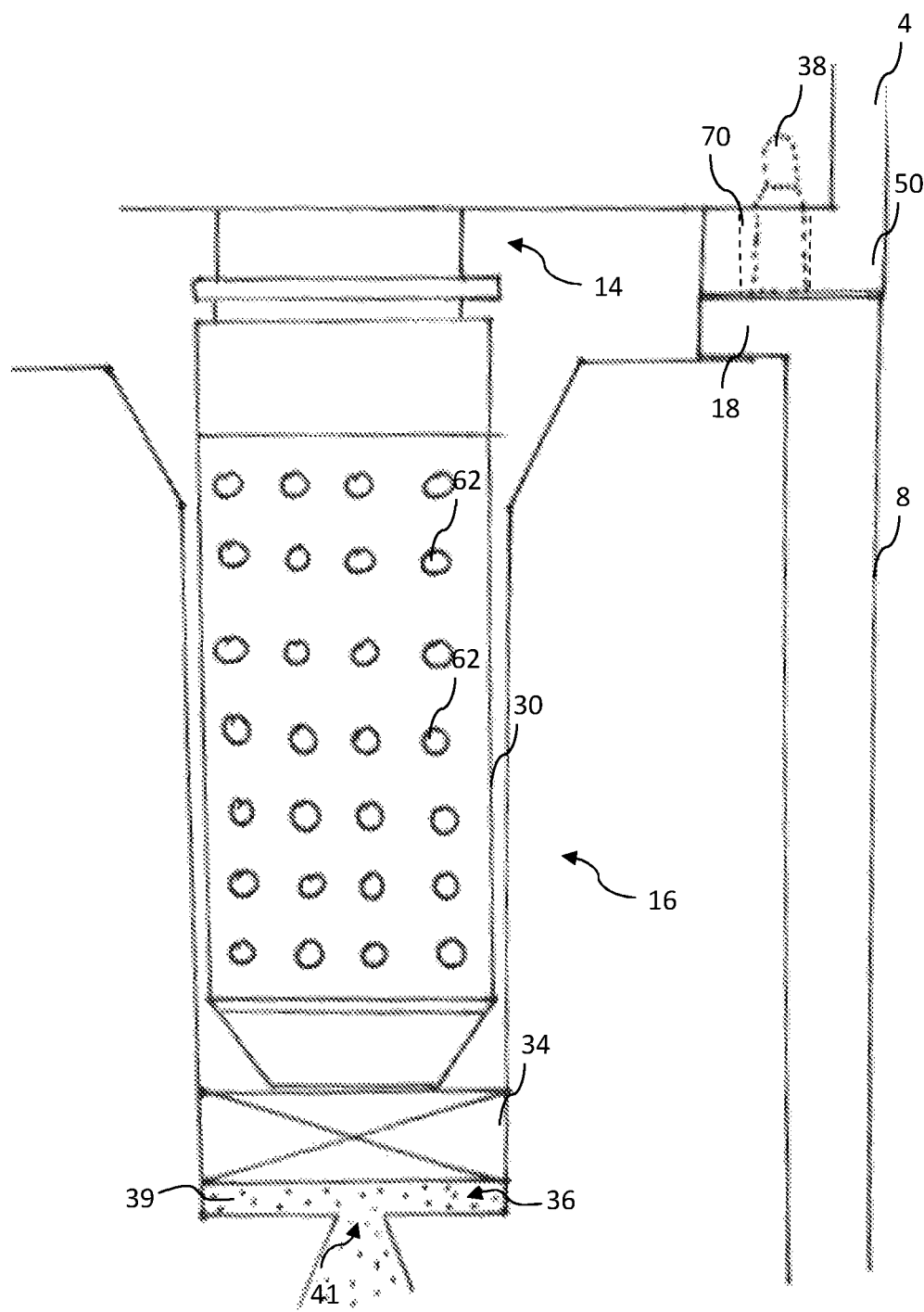

The final stage of the installation process is illustrated in FIG. 5d. This stage involves the gradual lowering of the guide post 14 further into the guide receiver 16, causing the tower sections 4, 8 to converge and bringing the respective flanges 18, 50 into contact with one another. This is achieved by use of the descender mechanism 36, and specifically in the illustrated embodiment, by the slow evacuation of sand 39 through the opening 41 located at the base 40 of the guide receiver 16, which causes the spring unit 34, and hence the guide post 14, to move deeper down into the guide receiver 16. The gradual descent of the guide post 14 within the guide receiver 16 allows the alignment pin 38 on the lower flange 18 to enter a corresponding slot 78 on the upper flange 50. As previously described, the insertion of each alignment pin 38 into its corresponding slot 78 provides additional fine alignment of the upper and lower tower sections 4, 8.

In one embodiment of the installation process, a smaller part of the load is transferred from the crane to the guide posts before during the third stage and the final stage and the load is only fully released from the crane when the two flanges are engaged. This allows for a less strong construction of the guide posts and guide receivers while still having the advantage of being less dependent on the weather and sea condition during engagement of the first and second structural parts.

In ensuring rapid, early decoupling of the upper tower section 4 from the influence of the floating vessel 6 (and hence from the movement of the waves), the guide system and method of the present invention is particularly advantageous as it allows the installation of wind turbines to be carried out under conditions that may not be suitable for standard installation methods, for example where the wave movement over the intended installation period would be too vigorous and unpredictable for standard installation methods. This allows wind turbine installation to be carried out over a larger proportion of the year (rather than having to wait for dead calm conditions), which is more economical. The installation and guide system described herein could be implemented in floatover installation of wind turbine, such as that described in the present Applicant's previous International patent application WO 2009/080035, and the subsequent applications and patents derived therefrom.

Many modifications may be made to the above examples without departing from the scope of the present invention as defined in the accompanying claims.

For example, it is envisioned that the guide receivers 16 and guide posts 14 are designed to be only temporarily attached to their respective tower sections. Once the tower sections have been securely attached to one another; as the interior of the tower sections is generally hollow, it would be simple to remove the guide receivers 16 and guide posts 14 (as they are simply bolted onto the turbine flanges). Alternatively, these components could be specifically designed permanently and non-detachably into their respective tower sections, or may be welded into place as was mentioned previously. However, having removable, reusable components would clearly be advantageous, as it would decrease the overall cost of installation.

It will also be appreciated that it would be possible to remotely activate the locking mechanism 60 if so desired, instead of relying on a transfer of load to trigger its activation. However, this option would need to take into account the shock loading during initial landing, as it would undesirable to activate the locking mechanism 60 whilst there is still potential for lift-off of components due to vessel heave.

Furthermore, it is envisioned that the guide system 12 may be utilised for installation of other turbine components, for example the installation of turbine blades onto the hub of a wind turbine. As will be appreciated by the skilled person, each blade will have a 'root' portion via which they are connected to the hub. The guide system could be implemented in this instance by providing guide receivers on the hub, and corresponding guide posts on the root portion of each blade that is to be attached. The alignment of the two turbine components could then be carried out in a similar manner to that described throughout this document, with the main difference being that instead of being oriented vertically, the guide receivers and guide posts would effectively be rotated 90 degrees compared to the main embodiment described herein, and would instead be oriented horizontally (with respect to the turbine tower axis).

As previously discussed, it would also be possible for this guide system to be utilised during installation of other wind turbine structural parts, for example, when landing a fully-assembled turbine tower on a foundation 2; installing a nacelle onto a turbine tower; installing blades onto the hub of a turbine; or should it be necessary to carry out split tower installation, to install one tower section onto another.

It should be noted that in the case of nacelle installation onto a tower, it would not be necessary to include the locking mechanism 60 and the associated locking members 62, as the nacelle is less unstable during installation than the tower sections 4, 8 would be. In the case of blade installation, only the guide post 14 and guide receiver 16 would be required to guide and align the blades in order to enable securing bolts to be inserted. The soft-landing element (i.e. the descender mechanism 36) would not necessarily be required, as the blades are inserted horizontally, rather than being landed vertically.

The invention claimed is:

1. An assembly of two structural parts of a wind turbine wherein the structural parts are to be connected in a flange-to-flange connection, the assembly further comprising a wind turbine installation system for guiding the two structural parts of a wind turbine during installation, the system comprising:
   a guide system for guiding the engagement of the first structural part to the second structural part, the guide system comprising:
   a guide post coupled to the first structural part;
   a guide receiver coupled to the second structural part and configured to receive the guide post therein; and
   a shock absorber arranged to dampen shock loads from the engagement of the guide post with the guide receiver, wherein the shock absorber includes a spring unit.

2. The assembly of claim 1, wherein the two structural parts of the wind turbine are: a foundation and a tower section; or a foundation and a complete tower; or two tower sections; or a tower and a nacelle; or a hub and a blade.

3. The assembly of claim 1, wherein the spring unit includes a coil spring.

4. The assembly of claim 1, wherein the shock absorber includes a damper.

5. The assembly of claim 1, wherein the shock absorber includes a descender mechanism.

6. The assembly of claim 5, wherein the descender mechanism comprises a chamber containing a flowable material, said chamber including a valve to evacuate the chamber.

7. The assembly of claim 6, wherein at least one of the following: the flowable material is substantially incompressible, the flowable material is granular, the flowable material is a fluid, and the valve is a removable plug.

8. The assembly of claim 6, wherein the descender mechanism includes a controllable fluid circuit to control the amount of material evacuated from the chamber.

9. The assembly of claim 8, wherein the fluid circuit is configured to control the evacuation of two or more chambers.

10. The assembly of claim 1, wherein the guide system includes locking means configured to lock the guide post to the guide receiver when installed therein.

11. The assembly of claim 10, wherein the locking means includes one or more deployable locking members that are engageable with a respective one or more sockets.

12. The assembly of claim 11, wherein the one or more deployable locking members are provided as part of the guide post, and the one or more sockets are provided as part of the guide receiver.

13. The assembly of claim 11, wherein the locking members correspond to a plurality of deployable locking balls.

14. The assembly of claim 1, wherein the guide post is coupled to an upper structural part and the guide receiver is coupled to a lower structural part.

15. The assembly of claim 1, wherein the shock absorber is provided as part of the guide receiver.

16. The assembly of claim 1, further comprising:
   a plurality of alignment pins provided on one of the structural parts; and
   a plurality of complementary alignment slots provided on the other one of the structural parts, each alignment slot arranged to receive a respective one of the plurality of alignment pins to enable fine alignment of the structural parts.

17. A method for guiding two structural parts of a wind turbine during installation, wherein the structural parts are to be connected in a flange-to-flange connection, the method comprising:
   converging a first structural part towards and onto a second structural part;
   aligning a guide post, coupled to the first structural part, with a guide receiver, coupled to the second structural part and configured to receive the guide post therein;
   engaging the guide post within the guide receiver; and
   damping, by a shock absorber, shock loads from the engagement of the guide post with the guide receiver, wherein the shock absorber includes a spring unit.

18. The method of claim 17 further comprising:
   initiating a further movement phase of the guide post within the guide receiver; and
   controlling, by the shock absorber, the further relative movement of the guide post within the guide receiver.

19. The method of claim 17, further comprising securing the guide post within the guide receiver to prevent removal of the guide post from the guide receiver.

20. A guide system for guiding the engagement of a first structural part to a second structural part of a wind turbine for an assembly of the two structural parts, the guide system comprising:

a guide post to be coupled to the first structural part of the wind turbine;

a guide receiver to be coupled to the second structural part of the wind turbine and configured to receive the guide post therein during the engagement; and a shock absorber arranged to dampen shock loads from the engagement of the guide post with the guide receiver, wherein the shock absorber includes a spring unit.

21. An assembly of two structural parts of a wind turbine wherein the structural parts are to be connected in a flange-to-flange connection, the assembly further comprising a wind turbine installation system for guiding the two structural parts of a wind turbine during installation, the system comprising:

a guide system for guiding the engagement of the first structural part to the second structural part, the guide system comprising:

a guide post coupled to the first structural part;

a guide receiver coupled to the second structural part and configured to receive the guide post therein;

a shock absorber arranged to dampen shock loads from the engagement of the guide post with the guide receiver;

a plurality of alignment pins provided on one of the structural parts; and a plurality of complementary alignment slots provided on the other one of the structural parts, each alignment slot arranged to receive a respective one of the plurality of alignment pins to enable fine alignment of the structural parts.

\* \* \* \* \*